(12) United States Patent
Chambers et al.

(10) Patent No.: US 10,018,982 B2
(45) Date of Patent: Jul. 10, 2018

(54) TRANSPONDER KEY TESTING DEVICE AND METHOD OF TESTING A TRANSPONDER KEY

(71) Applicants: Gregory Chambers, Kingsbridge (GB); Simon Ashby, Chester (GB)

(72) Inventors: Gregory Chambers, Kingsbridge (GB); Simon Ashby, Chester (GB)

( * ) Notice: Subject to any disclaimer, the term of this patent is extended or adjusted under 35 U.S.C. 154(b) by 0 days.

(21) Appl. No.: 14/894,702

(22) PCT Filed: May 30, 2014

(86) PCT No.: PCT/GB2014/051660
§ 371 (c)(1),
(2) Date: Nov. 30, 2015

(87) PCT Pub. No.: WO2014/191763
PCT Pub. Date: Dec. 4, 2014

(65) Prior Publication Data
US 2016/0132034 A1 May 12, 2016

(30) Foreign Application Priority Data
May 30, 2013 (GB) .................................. 1309701.9

(51) Int. Cl.
*G06K 7/01* (2006.01)
*G05B 19/048* (2006.01)
(Continued)

(52) U.S. Cl.
CPC ....... *G05B 19/048* (2013.01); *G07C 9/00309* (2013.01); *G07C 9/00857* (2013.01);
(Continued)

(58) Field of Classification Search
CPC ......... G06K 7/01; G05B 19/048; H04B 17/20
(Continued)

(56) References Cited

U.S. PATENT DOCUMENTS 5,416,471 A * 5/1995 Treharne ............. B60R 25/2009
340/426.28
5,764,156 A 6/1998 Chaloux
(Continued)

FOREIGN PATENT DOCUMENTS

WO WO2011039148 4/2011

*Primary Examiner* — Nam V Nguyen
(74) *Attorney, Agent, or Firm* — Walter A. Rodgers

(57) ABSTRACT

This invention relates to a transponder key testing device and to a method of testing a transponder key. The transponder key may be used with any article using transponder key technology, typically a motor vehicle. The transponder key testing device has a first memory (30) in which is stored data relating to an article signal emitted by each one of a number of articles (10) and a second memory (32) in which is stored data relating to a response signal emitted by each one of a number of transponder keys (20). The testing device has a receiver (24) adapted to receive the article signal and the response signal. The testing device compares the article signal with data in the first memory, compares the response signal with data in the second memory, and determines whether or not the transponder key (20) is compatible with the article (10). There is also provided a method of testing a transponder key for compatibility with a particular article.

17 Claims, 1 Drawing Sheet

(51) Int. Cl.
*H04B 17/20* (2015.01)
*H04B 17/10* (2015.01)
*G07C 9/00* (2006.01)
*H04Q 1/00* (2006.01)

(52) U.S. Cl.
CPC ......... *G07C 9/00896* (2013.01); *H04B 17/10* (2015.01); *H04B 17/20* (2015.01); *G05B 2219/24058* (2013.01); *G05B 2219/25196* (2013.01); *G07C 2009/00388* (2013.01); *G07C 2009/00777* (2013.01); *G07C 2009/00952* (2013.01)

(58) Field of Classification Search
USPC ....... 340/10.51, 10.52, 5.21, 5.22, 5.61, 3.3; 380/270
See application file for complete search history.

(56) References Cited

U.S. PATENT DOCUMENTS

| | | | |
|---|---|---|---|
| 5,864,297 A * | 1/1999 | Sollestre | G07C 9/00817 340/426.36 |
| 6,152,662 A * | 11/2000 | Titus | B23C 3/35 409/132 |
| 6,683,391 B1 * | 1/2004 | Enoyoshi | B60R 25/04 307/10.2 |
| 7,849,721 B2 * | 12/2010 | Bass | A45C 11/321 307/10.3 |
| 7,891,919 B2 * | 2/2011 | Bass | B23C 3/35 409/81 |
| 8,059,883 B1 * | 11/2011 | Watts | G06F 21/34 382/141 |
| 8,128,322 B2 * | 3/2012 | Bass | B23C 3/35 409/81 |
| 8,451,099 B2 * | 5/2013 | Donadini | G07C 9/00857 340/10.51 |
| 8,571,746 B2 * | 10/2013 | Tippelt | B60R 16/027 307/10.2 |
| 8,985,918 B2 * | 3/2015 | Bass | B23C 3/35 409/81 |
| 9,101,990 B2 * | 8/2015 | Mutch | B23C 3/35 |
| 2004/0095380 A1 | 5/2004 | Bass et al. | |
| 2010/0277273 A1 * | 11/2010 | Miller | B60R 25/2018 340/5.6 |
| 2011/0123026 A1 * | 5/2011 | Rebuli | B60R 25/00 380/270 |
| 2013/0259232 A1 * | 10/2013 | Petel | H04L 63/0492 380/270 |

* cited by examiner

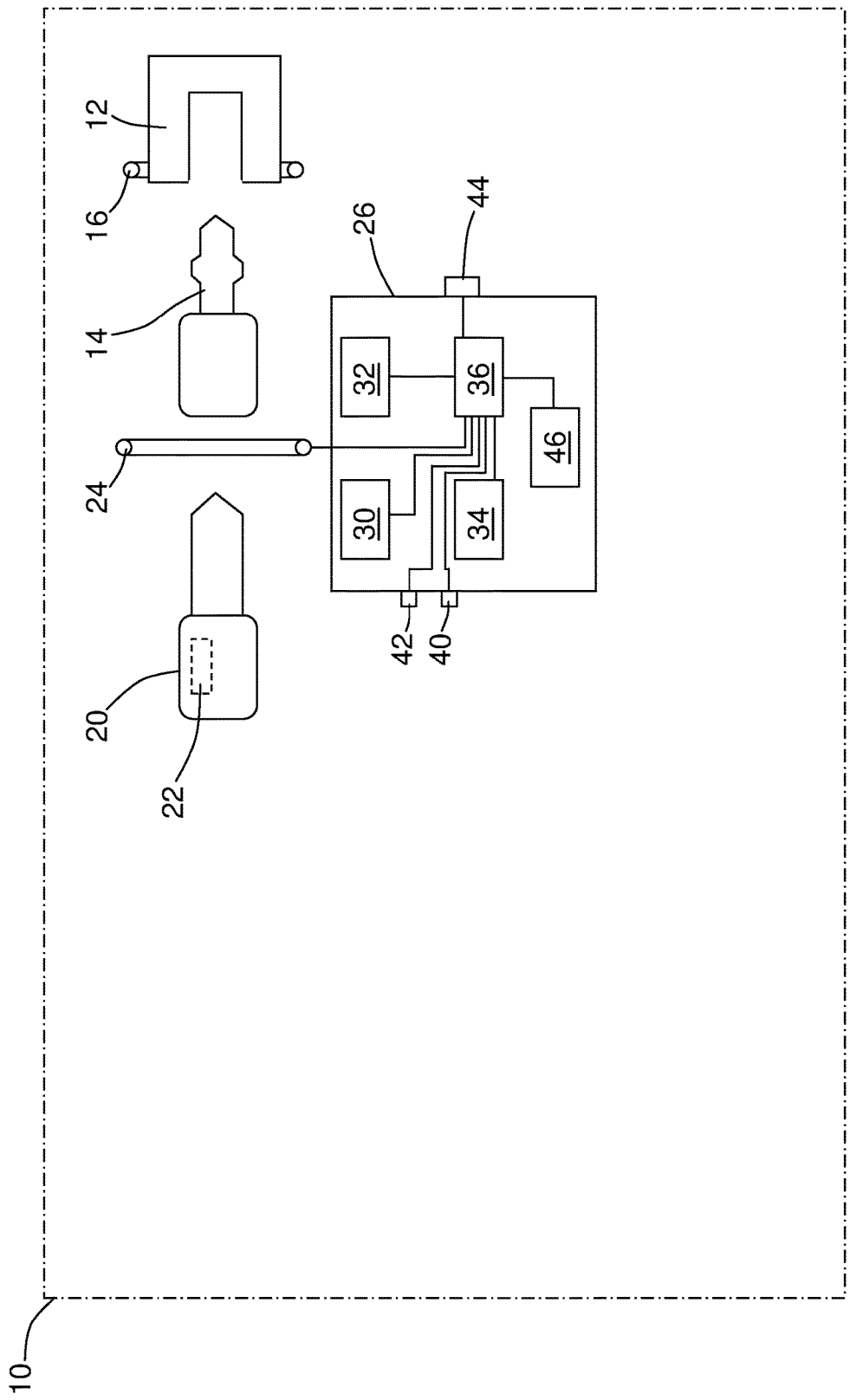

TRANSPONDER KEY TESTING DEVICE AND METHOD OF TESTING A TRANSPONDER KEY

FIELD OF THE INVENTION

This invention relates to a transponder key testing device and to a method of testing a transponder key. The invention relates in particular to a device and method for testing the suitability of a replacement transponder key for a motor vehicle. The term "motor vehicle" as used herein embraces cars, trucks, motorbikes, jet skis, boats, quad bikes and snowmobiles, all of which are known to use transponder keys. This list is not exhaustive, however, and it will be understood that the invention can be used for any article utilising transponder key technology as described below.

BACKGROUND TO THE INVENTION

Most motor vehicles are supplied with one or more keys which are required to open and operate the vehicle. Whilst early motor vehicles relied upon a mechanical key, many modern keys are fitted with transponders which can communicate with the vehicle in order to provide additional security.

Transponder keys contain an electronic circuit having a non-volatile memory and at least one electrical winding. The keys are typically passive in that they require no battery or external electrical supply, and instead receive power by way of the electromagnetic vehicle signal emitted wirelessly from the vehicle which causes a current to flow in the electrical winding. Sufficient power is obtained to allow the electronic circuit to recognise the vehicle signal and to generate a response signal (which is also emitted wirelessly).

The response signal includes an identifier which can in turn be interpreted by the vehicle, the vehicle control system being activated, and thereby allowing the vehicle to be operated, if the identifier indicates that the correct key is present.

Many motor vehicle transponder keys are "magnetic coupled transponders". These transponders operate at a frequency of 125 kHz or 134 kHz.

The vehicle is fitted with an antenna in the form of one or more induction coils which issue the vehicle signal to the key. For example, the vehicle signal may be issued as soon as the vehicle's doors are opened, or may be issued when the key is inserted and rotated in the ignition lock.

Some transponder keys have a very limited range, for example 50 mm. Such transponder keys cooperate with a vehicle antenna in the form of an induction coil located around the ignition lock, so that the antenna is less than 50 mm away from the handle of a key inserted into the lock.

In one known arrangement utilising such a transponder key, the key is inserted into the ignition lock and rotated to the 'on' position. The first stage of security is therefore provided by the mechanical form of the key, the mechanical form being required to match the form of the pins and tumblers within the ignition lock.

Turning the key to the 'on' position triggers the vehicle to emit the vehicle signal by way of its antenna. The winding in the handle of the transponder key absorbs some of the emitted energy and uses that energy to power the transponder's electronic circuit. The transponder emits its own response signal including the unique identifier. The response signal emitted by the transponder is usually digital and is received by the vehicle's antenna. The vehicle's security system interprets the response signal and if the identifier identifies the correct key the vehicle's operating system is activated and the vehicle can be operated. If the response signal does not include the correct identifier the vehicle's operating system is not activated and the vehicle cannot be operated. The transponder therefore provides a second stage of security, over and above the mechanical key.

Other transponders have a greater range and are used in vehicles having "keyless" operation. Such vehicles avoid the requirement for a mechanical key to be rotated in the ignition lock and rely totally upon the security provided by the transponder. Thus, the vehicle is typically fitted with several antennas which issue the vehicle signal, for example after the vehicle doors have been opened. Provided the transponder key is located within the vehicle (or very close to the vehicle) the transponder will receive sufficient power to energise the electronic circuit and issue a response signal. If the response signal indicates that the correct key is present the vehicle's operating systems are activated. Notwithstanding that a mechanical key is not required to operate such a vehicle, most vehicle manufacturers will nevertheless include a mechanical key to allow access to the vehicle in the event of a power failure.

A problem arises if the vehicle owner loses a transponder key, or both transponder keys in those cases where two transponder keys are supplied with the vehicle. It is necessary to supply a replacement or non-original transponder key having the correct mechanical form and the correct identifier.

It is possible to cut a key blank to the correct mechanical form, and there are many providers of key-cutting services. The key-cutter must choose the appropriate blank before cutting the mechanical form, but an appropriate blank can readily be identified, either visually or by way of the vehicle make and model.

It is also possible to program a replacement transponder key with the correct identifier for the vehicle, and vehicle suppliers and specialist operators such as the Automobile Association (in the UK) have the necessary equipment to program a replacement transponder key.

Notwithstanding that most of the motor vehicle transponder keys are magnetic coupled transponders operating at 125 kHz or 134 kHz, different transponder manufacturers utilise different operating parameters. Also, the transponder manufacturers update their operating parameters from time to time in line with developments in the technology and the desire to regularly improve security. Accordingly, not all transponder keys are compatible with all motor vehicles, and if an incompatible key is programmed with the correct identifier it will still not be able to be used because its response signal will not match the operating parameters required by the vehicle.

In those vehicles requiring the insertion and rotation of the mechanical key, it is necessary to cut the mechanical form of the key before the transponder can be tested. This can represent a significant problem for those operators offering the service of replacing transponder keys, since the cost of the replacement transponder key is significant and the replacement key will be wasted if the mechanical form has been cut and the key is subsequently found to be incompatible with the vehicle.

Since the transponder operating parameters will often be updated with each model change of a vehicle, and perhaps also at each design update for the vehicle, it is essential that operators providing replacement transponder keys are aware of every change of parameter for every type of transponder and every motor vehicle. In theory therefore, it is possible to ensure that only the correct type of replacement transponder key is sought to be programmed.

In practice, however, less diligent operators may not keep their records fully up to date and/or may not consult their records appropriately. Also, even the most diligent operator may not be able to identify whether a particular vehicle was manufactured before or after a relevant design update. In these cases, the operator might inadvertently seek to use an incompatible replacement transponder key.

There is a significant cost penalty in using an incompatible replacement transponder key. As above indicated the replacement key might be wasted if the mechanical form is cut before the transponder can be tested for compatibility with the vehicle. Even for those vehicles not requiring the insertion and rotation of a mechanical key, however, the operator may spend up to 30 minutes programming a transponder key, which time will be wasted if the transponder key is incompatible with the vehicle. Also, the operator typically has to pay a license fee for each transponder key he or she programs, so the programming of an incompatible transponder key has a direct financial penalty which cannot be recovered from the customer.

SUMMARY OF THE INVENTION

The inventors have sought to reduce or avoid the problems facing operators who provide the service of replacement transponder keys, and in particular in reducing the number of transponder keys, and the time and money which are wasted, when operators provide transponder keys which are incompatible with the vehicle.

According to the invention there is provided a transponder key testing device having a first memory in which is stored data relating to the vehicle signals issued by a number of motor vehicles and a second memory in which is stored data relating to the response signals emitted by a number of transponder keys, the testing device having a receiver adapted to receive the vehicle signal and the response signal, the testing device having means to compare the vehicle signal with data in the first memory and to compare the response signal with data in the second memory in order to assess whether or not the transponder key is compatible with the vehicle, the testing device further having an output means by which the results of the compatibility assessment are communicated to the operator.

The inventors therefore appreciate that different vehicle manufacturers will arrange for their vehicles to issue a vehicle signal which may be unique to a particular model, and may also be unique to a particular design update of that model. For example, a manufacturer such as Ford® will typically utilise a different vehicle signal for its Fiesta model than for its other models. Also, the vehicle signal issued by Ford Fiestas will typically change each time the Fiesta design is updated throughout its lifetime. By maintaining a memory of the vehicle signals issued by each motor vehicle the vehicle make, model and design detail can be established by the testing device.

In addition, the inventors appreciate that the transponders used in transponder keys are made by several different manufacturers, each of which has its own operating parameters. Also, each manufacturer updates its operating parameters from time to time. Even before a transponder key has been programmed with the unique identifier for a particular vehicle, it will issue a response signal which is unique to the transponder manufacturer and to the design update of the transponder. By maintaining a memory of the response signals issued by each transponder the manufacturer and update detail can be established by the testing device.

The testing device can therefore assess for the operator whether or not a particular transponder key is compatible with a particular vehicle before the transponder is programmed, so that the operator does not program an incompatible transponder key.

It will be appreciated that for those vehicles for which the vehicle signal is issued only after the mechanical key has been inserted and rotated in the ignition lock, it will be necessary to have a suitable mechanical key. Many vehicles are supplied with a spare mechanical key which does not have a transponder and that spare key may be available to the operator. If not, however, the operator can cut the mechanical key form into a non-transponder key blank, which key can be discarded after use. The cost of providing a non-transponder key and cutting the mechanical form is insignificant compared to the cost of a transponder key. Also, the requirement to cut the mechanical key form into a non-transponder key blank is known and can be included in the operator's costings.

Preferably, the testing device has manual data-input means, ideally in the form of a keypad. This permits the operator directly to control the operation of the testing device.

Desirably, the testing device has electronic data-input means, ideally in the form of a USB or other wired communication link to a computer or the like. The computer can be used to update the first memory and the second memory with vehicle and transponder design or model updates.

Preferably the output means comprises one or more lighting units. It is only necessary that the testing device indicate a compatible or incompatible result, so that the lighting unit(s) can display simply a green or red signal to the operator (for example). It may be desirable, however, for the testing device to display the make and model of the vehicle, and perhaps also the make and type of transponder key, as a double-check for the operator.

BRIEF DESCRIPTION OF THE PREFERRED EMBODIMENTS

The invention will now be described in more detail, by way of example, with reference to the accompanying drawing, which shows a representation of the transponder key testing device of the present invention.

DETAILED DESCRIPTION

FIG. 1 shows a motor vehicle 10 having an ignition lock 12 into which a mechanical key 14 can be inserted. The motor vehicle 10 has an antenna in the form of a single induction coil 16, the antenna in this embodiment surrounding the ignition lock 12.

A replacement or non-original transponder key 20 is provided, the transponder 22 of which is shown in dotted outline.

Adjacent to the ignition lock 12 and the replacement transponder key 20 is the receiver 24 of the testing device 26. It will be appreciated that it is not necessary for the receiver 24 to be between the ignition lock 12 and the replacement transponder key 20 as is drawn, but it must be close enough to the antenna 16 and the transponder 22 in order to pick up the limited range vehicle signal issued by the antenna 16 and the limited range response signal issued by the transponder 22. In the embodiment drawn the antenna 24 is in the form of a loop which can be placed very close to the ignition lock 12, and can for example surround the mechanical key 14 as it is inserted and rotated in the ignition lock.

The testing device 26 has a first memory 30, suitably in the form of a look-up table, in which is stored data relating to the vehicle signal issued by each one of a number of different motor vehicles. The testing device has a second memory 32, also suitably in the form of a look-up table, in which is stored data relating to the response signal emitted by each one of a number of different transponder keys. Whilst the first memory and second memory are shown as discrete components of the testing device 26, they could comprise a single component.

The testing device 26 also has a battery 34 and a controller 36 (ideally a microprocessor). The battery 34 provides electrical power to the testing device, and may be in addition to a power cable which can be connected to the mains electrical supply or to the battery (not shown) of the vehicle 10.

The controller 36 is connected to the receiver 24 and is able to identify the vehicle signal issued by the antenna 16 and the response signal emitted by the transponder 22. The controller is also connected to the first memory 30 and can compare the vehicle signal with the signals stored in the first memory. The controller 36 can thereby identify the make, model and design update of the vehicle 10.

The controller 36 is similarly connected to the second memory 32 and can compare the response signal issued by the transponder 22 with the signals stored in the second memory. The controller 36 can thereby identify the make and design update of the transponder 22.

One or other of the first memory 30 and the second memory 32 also contains compatibility data (perhaps in the form of a separate look-up table), specifically identifying the or each transponder make and design update which is compatible with a particular vehicle or group of vehicles. If the vehicle 10 and transponder 22 are assessed to be compatible the testing device 26 outputs a positive signal to the operator by way of green light 40. If the vehicle 10 and transponder 22 are not compatible the testing device 26 issues a negative signal to the operator by way of red light 42.

It can be arranged that both lights 40 and 42 illuminate together to indicate that the vehicle signal and the response signal have both been detected, so that if both lights do not illuminate the operator is alerted to the fact that the receiver 24 is out of range of one or both of the antenna 16 and the transponder 22, or the transponder 22 is out of range of the antenna 16. Alternatively, additional lights can be provided to indicate separately the detection of the vehicle signal and the response signal.

The testing device 26 has a first data input means 44 in the form of a USB connector by which it may be connected to an external computer. The testing device 26 also has a second data input means 46 in the form of a key pad to permit the operator to control the testing device. Optionally, the testing device can include a display if required. The connection to an external computer is required so that the first memory 30 and the second memory 32 can be periodically updated with design update details and compatibility details for vehicles and transponders, so that the testing device 26 is kept up to date with changes in vehicle signals and response signals which can be received, and the compatibility of particular vehicles with particular transponders.

It is not necessary that the communication link is wired and the testing device could alternatively include a wireless communication link to a computer.

In one embodiment, the battery 34 is rechargeable and the testing device 26 is adapted for fitment into a docking station for periodic recharging of the battery (such as at the end of each working day). The docking station may also provide a (wired or wireless) communication link to the controller 36 and can download from the controller details of the transponder keys which have been programmed that day (so that a permanent record can be retained if desired). The docking station can also be connected to a computer which has an up to date record of vehicle signal data, transponder response signal data, and vehicle/transponder compatibility data, that data being uploaded to the memories 30 and 32 each time the battery 34 is recharged so as to regularly and routinely keep the memories 30 and 32 up to date.

In operation of the testing device 26 of FIG. 1, the operator first obtains the required mechanical key 14. This will often be provided by the owner of the vehicle 10, but if a mechanical key is not available the correct mechanical form will be cut into a suitable (non-transponder) key blank.

The operator positions the receiver 24 and the replacement transponder key 20 close to the ignition lock 12. The mechanical key 14 is then inserted into the ignition lock 12 and rotated so that the vehicle signal is issued by way of the antenna 16. The vehicle signal is detected by the receiver 24 and communicated to the controller 36. The vehicle signal is also received by the transponder 22 which is triggered to emit its response signal. The response signal is also detected by the receiver 24 and communicated to the controller 36.

The detection of the vehicle signal and the response signal is displayed to the operator by way of a predetermined number of flashes of the red and green lights 40, 42 together. In an alternative embodiment the testing device could include a display upon which the detection of the vehicle signal and the response signal is confirmed (and perhaps also upon which the vehicle and/or transponder make and model are displayed).

The controller uses the first memory 30 to identify the vehicle 10. That identification will typically include the vehicle make, model and design update. The controller uses the second memory 32 to identify the transponder key 20. That identification will typically include the transponder manufacturer and its update detail.

The controller 36 then uses the compatibility table stored in the first memory 30 or in the second memory 32 (or in an alternative embodiment in a third dedicated memory) to determine whether the transponder key 20 is compatible with the vehicle 10. If the key 20 is compatible the green light 40 is illuminated for a predetermined time, for example three seconds. The operator can then proceed to cut the required mechanical form into the transponder key 20, and to program the transponder 22, in normal fashion.

If, however, the key 20 is not compatible the red light is illuminated. The operator then selects a different replacement transponder key and repeats the testing process until a compatible key is identified. In an embodiment having a display, the vehicle may be identified in the display, and the manufacturer (and perhaps model number) of the compatible transponder key(s) may also be identified in order to assist the operator in locating a suitable replacement transponder key.

The invention is equally applicable to use in vehicles which do not have an ignition lock, or which do not require the insertion and rotation of a mechanical key in order to trigger the vehicle signal. The testing device 26 could be used with such vehicles in an arrangement similar to that of FIG. 1, but without the requirement for the mechanical key 14.

The invention claimed is:

1. A replacement transponder key testing device adapted to test a compatibility of a replacement transponder key with a particular article in a situation in which original transponder key(s) for the particular article has(have) been lost, the testing device having a first memory in which is stored data relating to an article signal emitted by each one of a number of articles, the number of articles including the particular article, and a second memory in which is stored data relating to a response signal emitted by each one of a number of possible replacement transponder keys, none of the possible replacement transponder keys having been supplied with the particular article so that the compatibility of the possible replacement transponder keys with the particular article is not known, the testing device having a receiver adapted to receive the article signal emitted by the particular article and the response signal emitted by a chosen possible replacement transponder key, the testing device being adapted to compare the article signal emitted by the particular article with data in the first memory, to compare the response signal emitted by the chosen possible replacement transponder key with data in the second memory, and to make a compatibility determination by determining whether or not the chosen possible replacement transponder key is compatible with the particular article, the testing device further having an output for outputting a result of the compatibility determination; and wherein the compatability determination is positive when the response signal matches with the article signal.

2. The replacement transponder key testing device according to claim 1 having a manual data-input element.

3. The replacement transponder key testing device according to claim 2 in which the manual data-input element is a keypad.

4. The replacement transponder key testing device according to claim 1 having an electronic data-input element.

5. The replacement transponder key testing device according to claim 4 in which the electronic data-input element is a universal serial bus (USB) port.

6. The replacement transponder key testing device according to claim 1 in which the output comprises one or more lighting units.

7. The replacement transponder key testing device according to claim 1 in which the output is adapted to indicate only a compatible or an incompatible result.

8. The replacement transponder key testing device according to claim 1 in which the testing device is adapted to identify the article from the comparison of the article signal with data in the first memory.

9. The replacement transponder key testing device according to claim 8 in which the testing device is adapted to identify the transponder from the comparison of the response signal with data in the second memory.

10. The replacement transponder key testing device according to claim 9 in which the output is adapted to identify the article.

11. The replacement transponder key testing device according to claim 8 in which the output is adapted to identify the article.

12. The replacement transponder key testing device according to claim 1 in which the receiver is a loop antenna.

13. The replacement transponder key testing device according to claim 1 in which the article is a motor vehicle.

14. A method of testing a replacement transponder key for compatibility with a particular article in a situation in which original transponder key(s) for a particular article has(have) been lost, the method comprising the steps of:
{i} providing a replacement transponder key testing device having a first memory, a second memory and a receiver adapted to receive wireless signals,
{ii} storing in the first memory data relating to an article signal emitted by each one of a number of articles, the number of articles including the particular article, and storing in the second memory data relating to a response signal emitted by each one of a number of possible replacement transponder keys,
{iii} providing a possible replacement transponder key which was not supplied with the article, the possible replacement transponder key having a transponder which is not known to be compatible with the particular article, and a metallic blank into which a mechanical key form can be cut,
{iv} triggering the particular article to issue its article signal and communicating the article signal to the testing device by way of the receiver,
{v} triggering the transponder of the possible replacement transponder key to issue its response signal and communicating the response signal to the testing device by way of the receiver,
{vi} comparing the article signal issued by the particular article with data in the first memory,
{vii} comparing the response signal issued by the possible replacement transponder key with data in the second memory,
{viii} making a compatibility determination by determining whether or not the possible replacement transponder key is compatible with the article, and
{ix} if the compatibility determination is negative, selecting another possible replacement transponder key and repeating steps {iv} to {viii} above, and alternatively if the compatibility determination is positive and the replacement transponder key is a compatible replacement transponder key, programming the transponder of the compatible replacement transponder key with an identifier for the article; and
wherein the compatibility determination is positive when the response signal matches with the article signal.

15. The method according to claim 14 in which the step of triggering the article to issue the article signal includes rotation of a key in a lock, the method including additional steps of providing a non-transponder key blank and cutting a key form into the key blank to match a required mechanical key form for the lock.

16. The method according to claim 15 in which the article is a motor vehicle.

17. The method according to claim 14 in which the article is a motor vehicle.

* * * * *